(12) United States Patent
Garzon et al.

(10) Patent No.: US 7,854,524 B2
(45) Date of Patent: Dec. 21, 2010

(54) HIGH STIFFNESS LOW MASS SUPPORTING STRUCTURE FOR A MIRROR ASSEMBLY

(75) Inventors: Guillermo Garzon, Frisco, TX (US); Joseph Caracci, Wading River, NY (US); Sharad Mehta, Westborough, MA (US)

(73) Assignee: Anorad Corporation, Shirley, NY (US)

( * ) Notice: Subject to any disclaimer, the term of this patent is extended or adjusted under 35 U.S.C. 154(b) by 409 days.

(21) Appl. No.: 11/864,806

(22) Filed: Sep. 28, 2007

(65) Prior Publication Data

US 2009/0086350 A1 Apr. 2, 2009

(51) Int. Cl.
*G02B 7/182* (2006.01)
*B23B 31/10* (2006.01)

(52) U.S. Cl. .................... 359/871; 279/146

(58) Field of Classification Search ... 359/198.1–200.8, 359/368–398, 811–830, 846–849, 871, 872
See application file for complete search history.

(56) References Cited

U.S. PATENT DOCUMENTS

| 5,028,797 A * | 7/1991 | Abe et al. .................... 250/548 |
| 5,206,702 A | 4/1993 | Kato et al. |
| 5,421,916 A | 6/1995 | Nachtrab et al. |
| 5,621,491 A | 4/1997 | Ohishi et al. |
| 5,917,580 A * | 6/1999 | Ebinuma et al. .............. 355/53 |
| 6,285,444 B1 * | 9/2001 | Osanai et al. ................. 355/72 |
| 6,330,837 B1 | 12/2001 | Charles et al. |
| 6,567,212 B1 | 5/2003 | Engelhardt et al. |
| 6,891,601 B2 * | 5/2005 | Jeanne et al. ................. 355/72 |
| 7,031,055 B2 | 4/2006 | Engelhardt et al. |
| 7,164,853 B2 | 1/2007 | Tomita |
| 7,307,784 B2 | 12/2007 | Kinoshita et al. |
| 7,315,412 B2 | 1/2008 | Kinoshita et al. |

* cited by examiner

*Primary Examiner*—Stephone B Allen
*Assistant Examiner*—Jade R Chwasz
(74) *Attorney, Agent, or Firm*—Turocy & Watson LLP; R. Scott Speroff; John M. Miller (57) ABSTRACT

Systems and methods of providing support to a mirror assembly including a high-stiffness, low mass structure. An L-shaped support, in conjunction with a shelf member and a plurality of fingers, provides support to a chuck upon which an operation (such as a wafer inspection) can be carried out. Materials such as ALBEMET and INVAR can be used to reduce mass and increase stiffness to avoid resonance in the system. Sensors and actuators can be employed to sense input energy and adjust the structure, respectively, if resonance is deemed likely.

14 Claims, 10 Drawing Sheets

HIGH STIFFNESS LOW MASS SUPPORTING STRUCTURE FOR A MIRROR ASSEMBLY

BACKGROUND

In a previous era, the microscope was considered a breakthrough invention that provided access to a miniature world once beyond our ability to explore. Today's technology has built upon this foundation to continue to erode the dimensional limits on what we can see, manipulate, build, and develop. For example, the nanometer is a common unit of measurement, and in some applications the picometer and femtometer are common. As technology improves, increasingly minute dimensions can be explored; however, disturbances such as vibrations, impurities, and the like become increasingly disruptive to sensitive operations at the nanometer level and beyond. Equipment that may be considered flat or still at the micron level, for example, can appear prohibitively rough and unsteady at the nanometer and picometer level. It is an increasing challenge to engineers to eliminate or avoid the problems associated with the inherent irregularities as dimensions diminish in size.

Vibration presents another difficulty to microscopic operations. All matter vibrates to some degree—even small thermal vibrations experienced by all matter at a temperature above absolute zero—and such vibrations can disrupt an operation that requires accuracy to the nanometer or picometer. Resonance in the supporting structures must be avoided, and to do so, the lowest mode natural frequency of the equipment used in such operations must be as high as possible. Virtually any action taken on a small operation inputs energy to the system, which can cause vibration of sensitive elements. If the input vibration forces approximate the natural frequency of a component the results due to resonance can be catastrophic.

Natural frequency increases with stiffness, but varies inversely to the size of mechanical elements; however, stiffness (or at least resistance to deflection) can be achieved by increasing size. Previous attempts at avoiding resonance have focused on increasing size to ensure that the natural frequency of the structure is higher than expected vibration levels. Also, efforts have been made to reduce the energy input and resultant vibrations. This result has limited applicability at very small dimensions where even thermal vibrations cause an appreciable energy input.

SUMMARY

The following presents a simplified summary of the innovation in order to provide a basic understanding of some aspects of the innovation. This summary is not an extensive overview of the innovation. It is intended to neither identify key or critical elements of the innovation nor delineate the scope of the innovation. Its sole purpose is to present some concepts of the innovation in a simplified form as a prelude to the more detailed description that is presented later.

A supporting structure is provided for a mirror assembly for use with very small operations. A pair of arms can be arranged in an L-shape with fingers and a supporting shelf member providing support to a chuck, upon which an operation (e.g., a wafer inspection) can be performed. The fingers can be made of ALBEMET to achieve high stiffness at a low mass, to increase the overall natural frequency of the structure. An annulus can be provided below and concentrically with the chuck, which can be moved and/or rotated as desired. The annulus can be constructed of INVAR and can have a non-uniform thickness so that rotation of the annulus provides tilting of the chuck.

In an aspect, sensors can be employed to detect input energy sources and the frequency of such input. In addition, the natural frequency of the system can be monitored and compared against any input forces to guard against the onset of resonance forces. If input energy approaches the natural frequency of the system such that resonance is likely, an alarm can be provided to alert a user or appropriate oversight mechanism to the fact. The alarm can also issue a command to halt, slow, or delay an operation to prevent damage to the structure or the object of the operation.

To the accomplishment of the foregoing and related ends, the invention then, comprises the features hereinafter fully described and particularly pointed out in the claims. The following description and the annexed drawings set forth in detail certain illustrative aspects of the innovation. These aspects are indicative, however, of but a few of the various ways in which the principles of the innovation may be employed; the subject innovation is intended to include all such aspects and their equivalents. Other objects, advantages, and novel features of the innovation will become apparent from the following detailed description of the innovation when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

As used in this application, the terms "component" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity. Furthermore, all or portions of the subject innovation may be implemented as a method, apparatus or article of manufacture using standard programming and/or engineering techniques to produce software, firmware, hardware, or any combination thereof to control a computer to implement the disclosed innovation.

Figure 1:
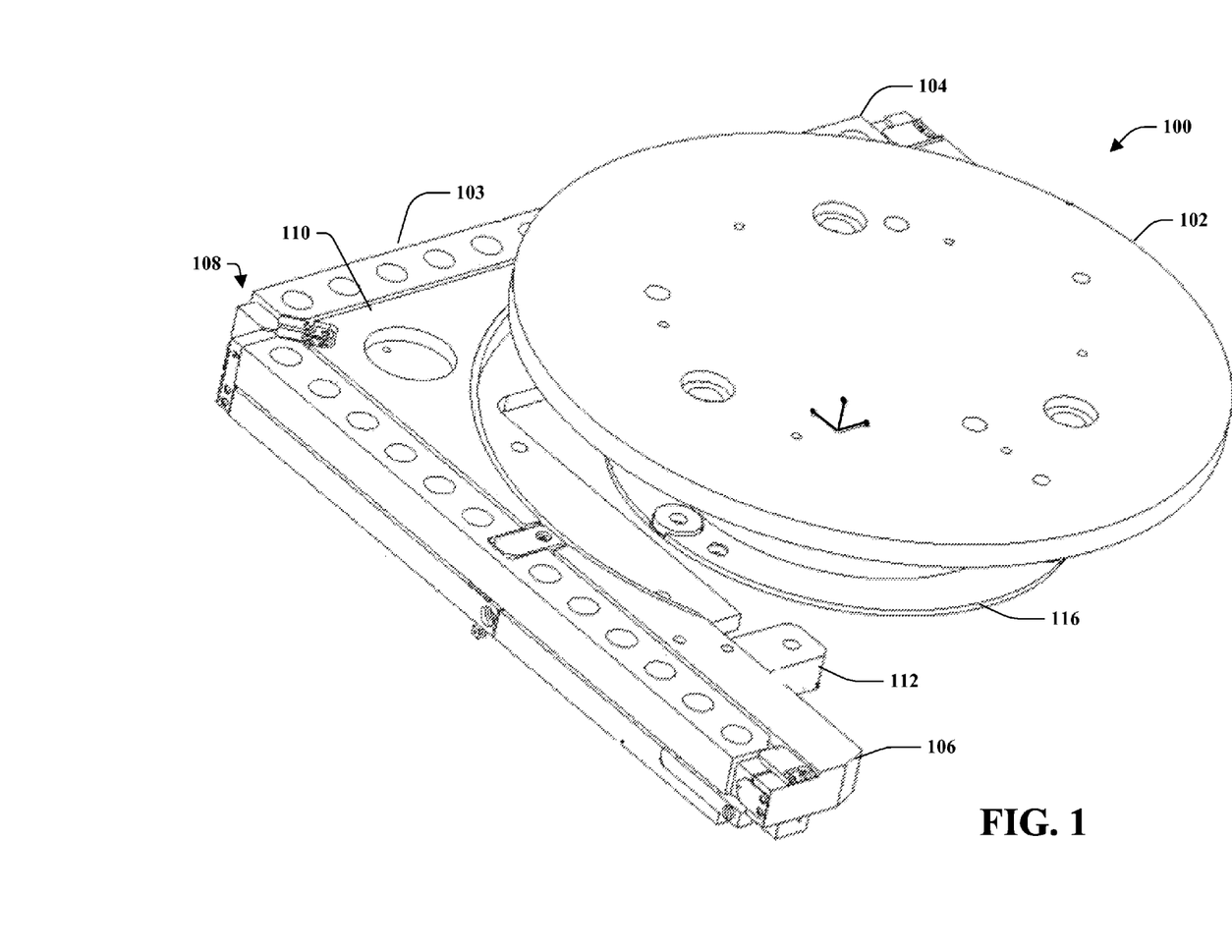
FIG. 1 illustrates a high stiffness, low mass supporting structure for a mirror assembly, including a pair of arms with supporting fingers, an L-shaped supporting shelf, and a chuck.

FIG. 1 depicts a high stiffness, low mass, supporting structure 100 for a mirror assembly. The subject innovation relates generally to avoiding the problems with resonance caused by small energy inputs, and will be described herein in the context of a mirror assembly; however, it is to be appreciated that the principles of the subject disclosure can be practiced in any environment that is sensitive to resonance at small vibration levels. In particular, a mirror assembly can be used to detect deflections and imperfect positioning of a small item, such as a semi-conductor wafer, placed on chuck 102. The target item can be located anywhere on the chuck 102 and can be the subject of some operation such as an inspection, or a manufacturing technique. A mirror 103 can be used to reflect a laser or other optical measurement device to measure a vertical distance between the chuck 102 and a sensor (not shown). A plurality of lasers can be used to determine flatness of the chuck 102 and/or the object (e.g., the wafer) placed thereon. Flatness is only one of several characteristics that can be measured in this manner, accommodated by the structure 100. It is to be appreciated that any type of measurement can be performed on any substrate or other object placed on the chuck 102. Also, a wide variety of operations can be performed on the object (e.g., inspection, heating, welding, cutting), and the subject innovation is not limited to a specific operation, despite the use of specific examples in this disclosure.

Vibrations caused by energy input to the structure 100 can cause problems with the operation due to the sensitive nature of extremely small components, and can come from any of a variety of sources: actuators, lasers, and fluid flow, for example. Today's microscopes and other instruments are capable of accuracy at the nanometer level and beyond; however, their efficacy is limited by irregularities in the supporting structure 100. Also, vibration (especially at frequencies approaching a resonant frequency) present in the system can be an impediment to optimal operation. To mitigate these problems, a high stiffness, low mass supporting structure 100 is implemented. In an aspect, structure 100 includes a first arm 104 and a second arm 106. At the intersection of the arms, a corner area 108 can be dimensioned to accommodate chuck 102. A shelf 110 can extend from the corner 108 and provide a measure of support to the chuck 102. Support members such as finger 112 (an equivalent opposing finger can be seen more clearly in FIG. 2) can extend from the arms 104 and 106 to provide additional support to the chuck 102; also, an annular ring 116 can provide support and angular positioning.

Due to the sensitive nature of the processes that can be carried out by the disclosed novel structure 100, and the small dimensions of the object on which the process can operate, the lowest natural frequency (e.g., the first mode, or fundamental frequency) of the structure 100 should be as high as possible to avoid the well-documented problems associated with resonance. The various elements of the structure 100 can be dimensioned to maximize natural frequency by increasing the stiffness of the material, and decreasing the size of the components. In general, the larger the structure, the lower the natural frequency of the structure. This can be illustrated by guitar strings—the smaller strings produce a higher tone (higher frequency) and the larger strings produce a lower tone (lower frequency). As shown, structure 100 includes only a first arm 104 and a second arm 106, in contrast to prior configurations that featured four arms (or other large configurations). It is to be appreciated that reduced size of the structure 100 can be achieved in a variety of configurations, and that the subject innovation is not limited to the specific examples shown here.

In addition to dimensioning the structure 100 to maximize the natural frequency and avoid resonance, the stiffness of the material can be chosen to increase the natural frequency. In one embodiment, finger 112 is made of an aluminum/beryllium alloy such as ALBEMET, which provides excellent stiffness at a low mass. ALBEMET can be constructed of commercially pure aluminum and beryllium, aluminum and beryllium have low mutual solubility, and the final product has an endurance limit. Therefore, so long as any vibration forces and other deflections are kept below the endurance limit the fingers made of ALBEMET have no fatigue limit and can be used theoretically forever without failure. In the type of application as described herein, this is a realistic goal given the relatively low loads and small dimensions involved. In addition, the thermal properties of ALBEMET are very good. Lasers and other optical sensor equipment can generate appreciable amounts of heat, the adverse affects of which, however, are mitigated by using such a material.

Annular ring 116 can also be dimensioned to reduce size and therefore increase natural frequency of the system. In addition, the material of the annular ring 116 can be made of a highly heat-resistant material such as INVAR. As with other components, lasers and other optical sensors that can be used in connection with the subject disclosure can generate inadvisable heat levels, and any thermal deflection or deformation of the structure can cause inaccuracies—especially in microscopic operations that depend on precise measurements and reliability. INVAR, also called FeNi, is an alloy of iron (e.g., 64%) and nickel (e.g., 36%) with some carbon and chromium, and is known for its unique properties of controlled coefficient of thermal expansion. Other materials with similar thermal properties can be employed as well. It is to be appreciated that the materials mentioned in the examples given here are listed for illustration only, and the subject innovation is not to be limited to the examples given in any way.

Figure 2:
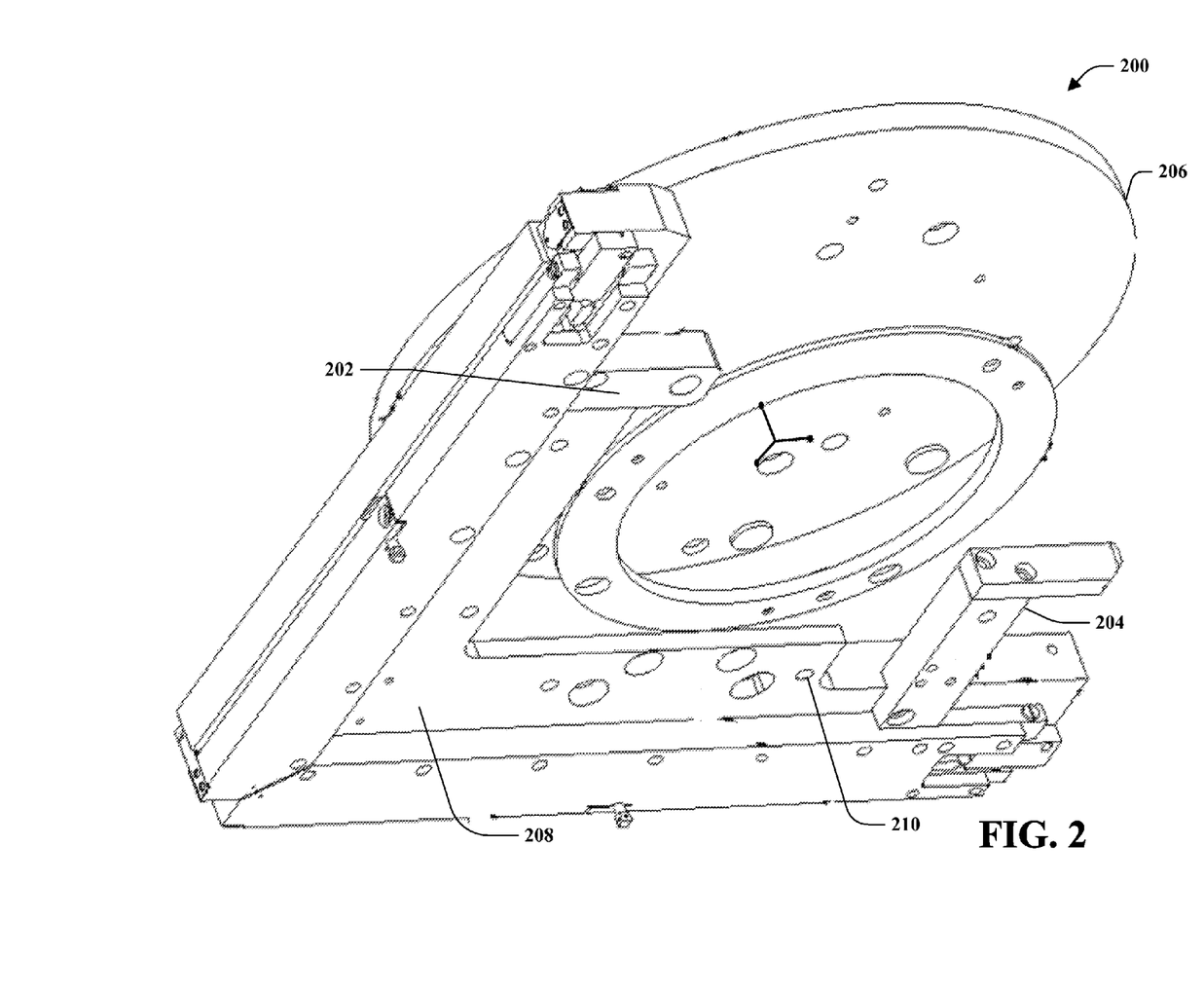
FIG. 2 is an exploded view of a high stiffness, low mass supporting structure for a mirror assembly.

FIG. 2 depicts an exploded view of a high stiffness, low mass supporting structure 200 and related components, shown from an underside for clarity. Fingers 202 and 204 can provide support for the chuck 206. Shelf 208 is here shown as an L-shaped shelf that can also provide support for the chuck 206. Throughout the assembly 200 are a plurality of holes 210 that can receive fasteners to fix the structure 200 in place during an operation. These holes 210 can have an affect on the natural frequency of the structure 200, and therefore can be strategically placed throughout the structure 200 at the discretion of a skilled designer. In addition, different applications of the subject innovation may call for different fastening approaches, any of which is possible in connection with the subject disclosure.

Figure 3:
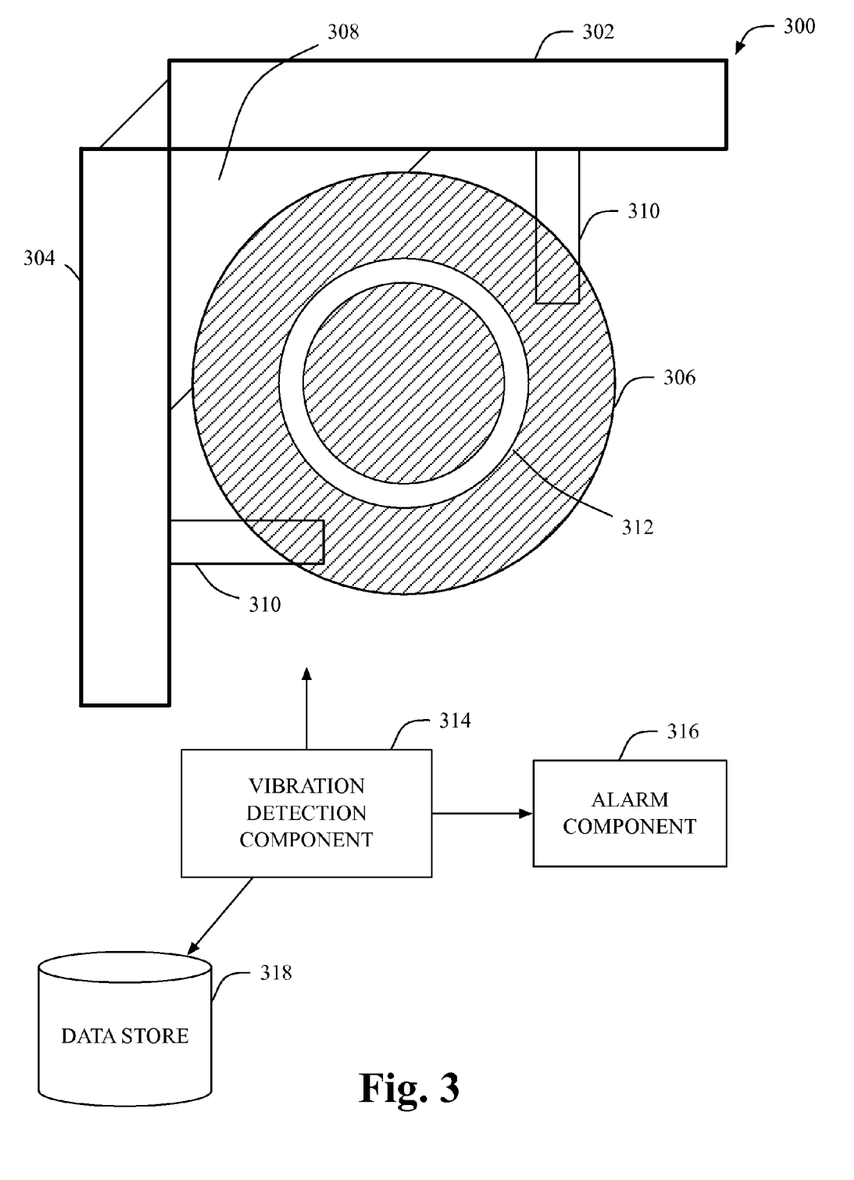
FIG. 3 is a conceptualized depiction of a high stiffness, low mass supporting structure for a mirror assembly, including a vibration detection component, an alarm component, and a data store.

FIG. 3 is a conceptualized view of a low mass, high stiffness support structure 300 according to the present invention. Supporting arms 302 and 304 can provide a stable connection to a surface such as a worktable or a conveyor line, and can include some form of vibration damping equipment to minimize the vibration input to the system from the underlying structure. As will be appreciated by one of ordinary skill in the art, supporting arms 302 and 304 can include fasteners to connect to an underlying structure, or can rest on a surface or another apparatus, depending on the application. Chuck 306 is shown near the center of arms 302 and 304 and can be connected to the structure 300 at a corner member 308, a plurality of fingers 310, and an annular ring 312. As described previously, these components can be chosen of a material that has excellent material properties such as low mass, low coefficient of thermal expansion, and high stiffness, such as ALBEMET or INVAR. Previous designs featured a larger, more clumsy design which surrounded the chuck 306, creating a lower natural frequency which is undesirable for a variety of reasons. The subject innovation improves upon conventional methods by reducing the size of several of the components and therefore increasing the natural frequency of the structure 300.

Resonance creates very large forces in a structure, and is a well documented physical phenomenon. All physical structures have a natural frequency (which is a function of size, mass, dimensions, damping and other factors) representing the lowest frequency at which resonance can be achieved. Resonance occurs when an input force on a device approaches the device's natural frequency; the force can come from vibration from a motor or actuator, fluid flow over a device, sound, light, or any other source of input energy that acts on the device. While there are many natural frequencies higher than the natural frequency, the most destructive forces are found at the lowest frequency. Also, it is preferable to design a system so that any input forces are well below the natural frequency of a device rather than to attempt to evade some of the higher frequencies.

In general there are two approaches to avoiding resonance: monitoring and mitigating input forces, and increasing the natural frequency of the device. In conventional structures such as buildings both are viable options. However, at the microscopic level (and beyond), monitoring input forces becomes less feasible. At extremely small dimensions, even the oscillations caused by the heat in the system (unless at absolute zero) can cause appreciable negative affects to an operation. Moreover, increasing the natural frequency has traditionally also been problematic because to increase stiffness, many attempts have been made to increase the size of the structure. While this can have limited success, increasing the size of devices to minimize deflections and vibrations often causes a reduction in natural frequency rather than an increase (the larger the structure, the lower the natural frequency). The subject disclosure provides a novel approach by choosing materials that can provide high stiffness and high natural frequency because of their small size.

In order to assist in avoiding resonant forces in the structure, a vibration component 314 can be employed to monitor the vibration of the structure. Sensors can be utilized to detect vibration of any component of the structure 300. If any input energy sources approach the natural frequency of the structure 300, an alarm component 316 can create an alarm and facilitate delivery of the alarm to an appropriate oversight mechanism. Given the sensitive and sometimes expensive nature of such small operations, the alarm component 316 can prevent failure of an element of the structure 300 by warning a user of the impending resonant forces. In addition, the alarm component 316 can direct the operation to cease until the dangerous conditions no longer pose a threat.

The vibration detection component 314 and alarm component 316 can communicate with a data store 318 to compare the current vibration and input energy levels to the natural frequency of the structure 300. Data store 318 can contain, volatile memory or nonvolatile memory, or a combination thereof. In one example, nonvolatile memory can include read only memory (ROM), programmable ROM (PROM), electrically programmable ROM (EPROM), electrically erasable ROM (EEPROM), or flash memory. The memory can include removable memory such as Compact Flash cards, Secure Digital cards, and the like. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store of the subject systems and methods is intended to comprise, without being limited to, these and any other suitable types of memory.

Figure 4:
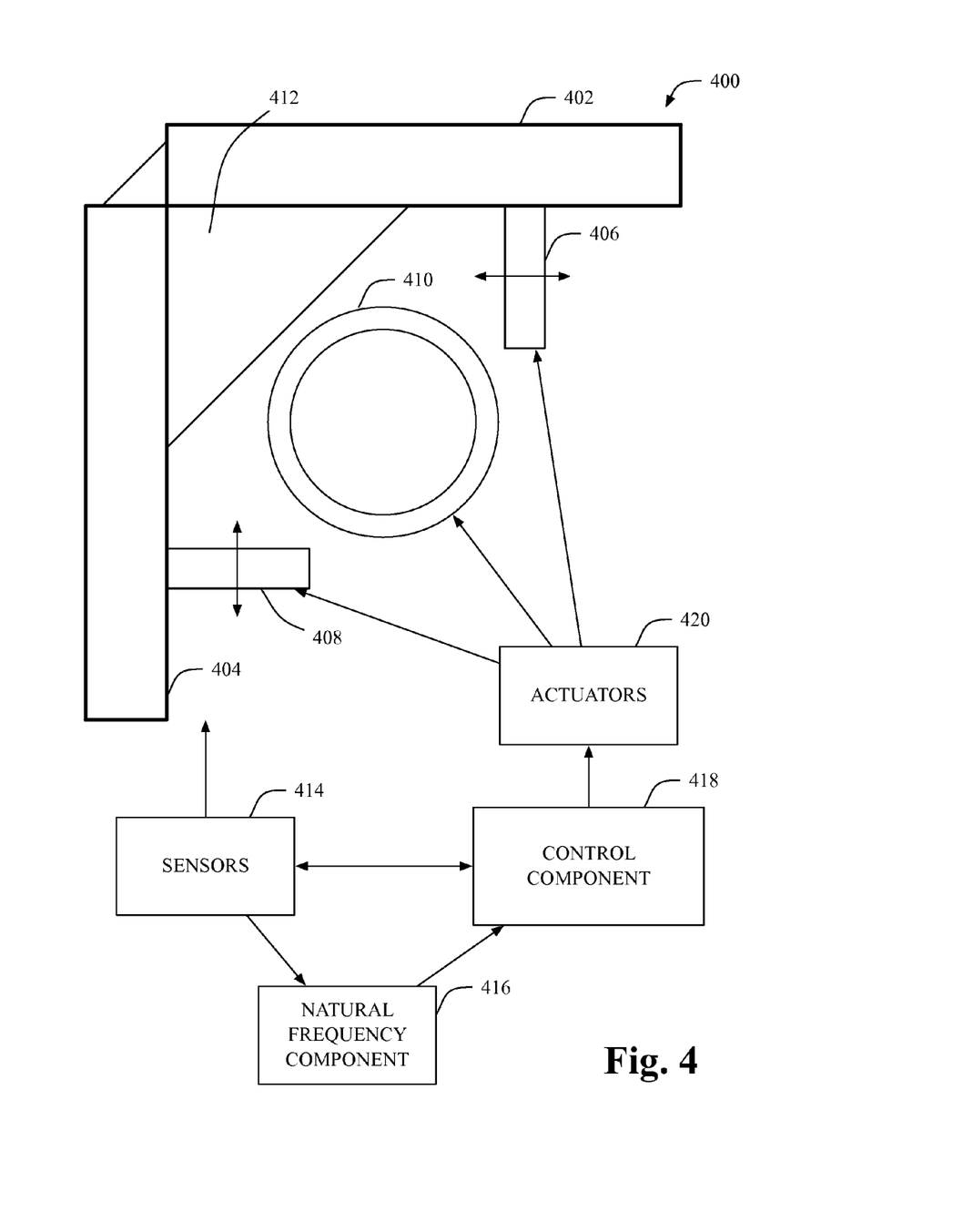
FIG. 4 is a conceptuatlized illustration of a high stiffness, low mass supporting structure for a mirror assembly, including sensors, a natural frequency component, a control component and a plurality of actuators.

FIG. 4 depicts a structure 400 having high stiffness but low mass for supporting a mirror assembly. In an aspect, arms 402 and 404 can provide fundamental support for a mirror assembly, and can attach to an underlying structure through fasteners, glue, or any other comparable mechanism. In order to support a mirror assembly, several components can be utilized to connect arms 402 and 404 with the mirror assembly. Fingers 406 and 408 can be constructed of a material of high stiffness, and therefore can be of a relatively small size. For clarity, the structure 400 is shown without an overlying chuck or mirror assembly. In practice, a chuck and mirror assembly can be placed over fingers 406 and 408 and can be centered over annular ring 410. In addition, corner member 412 can provide a measure of support for the chuck and the mirror assembly. Annular ring 410 can be made of a material of high stiffness and low thermal expansion, such as INVAR.

In an aspect, fingers 406 and 408 can assume varying positions along the arms 402 and 404, to accommodate a chuck of a different size, or to alter the natural frequency of the structure 400. In addition, the annular ring 410 can rotate or move linearly to accommodate varying chuck sizes, and also to alter the natural frequency of the structure 400. The natural frequency depends on various factors, such as material properties, dimensions, fluid properties of the surrounding fluid (usually air, but other fluids are possible), and boundary conditions such as mounting configurations and the like. The boundary conditions can include which points are fixed to an underlying structure, which points are free to move, or rotate, with respect to an underlying structure. The position and attachment of the fingers 406 and 408, and the angular position of the annular ring 410 can have an affect on the natural frequency; by moving fingers 406 and 408, and annular ring 410, the natural frequency of the structure 400 can be altered advantageously.

In one example embodiment, a plurality of sensors 414 can be employed to sense characteristics of the structure 400, including but not limited to position of the fingers 406 and 408 and annular ring 410, the size, position, and weight of the chuck and mirror assembly mounted to the structure 400. The characteristics sensed by the sensors 414 can relate to factors that influence the natural frequency of the structure 400, and this information can be supplied to a natural frequency component 416 which can calculate or approximate the natural frequency of the structure 400. In addition to information relating to the natural frequency, the sensors 414 can detect vibration in the structure 400 and any input energy. For example, any actuators or motors that operate on the mirror assembly can input energy to the system, which can have an appreciable effect on the vibration levels inherent in the structure 400. If these input energy sources approach the natural frequency of the structure 400, undesirable resonance can occur.

With information relating to the natural frequency and the input energy, resonance can be predicted and therefore avoided. A control component 418 can receive the information from the sensors 414 and the natural frequency component 416 and take action to prevent resonant forces from harming the structure 400 or any related objects such as a wafer or other object being inspected on the mirror assembly. In an aspect, a series of actuators 420 can be employed to alter the configuration of the structure 400 by, for example, moving at least one of the fingers 406 and 408 along the arms 402 and 404 respectively, or by moving and/or rotating the annular ring 410. These motions can be performed by actuators 420 that are part of the structure 400, in which case the fingers 406 and 408 can move under direction from the control component 418. In another aspect, the actuators can be separate from the structure 400 and can move the fingers 406 and 408 and the annular ring 410 and then retract from the structure 400 so as not to affect the delicate natural frequency of the structure 400.

Figure 5:
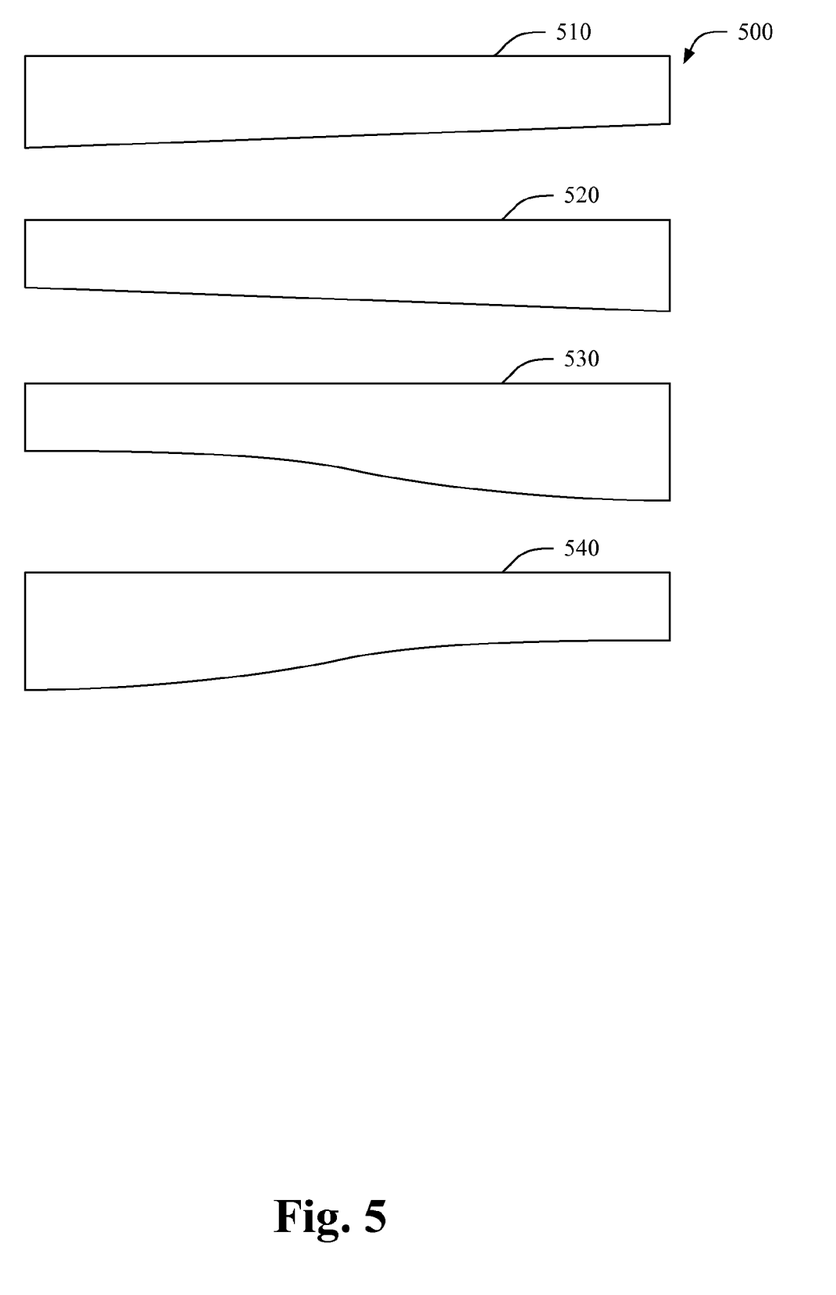
FIG. 5 is a depiction of a series of exemplary annulus configurations.

FIG. 5 represents a series of annular ring configurations 500 for use with the high stiffness, low mass supporting assembly as described above. Flatness is a concern of operations of very small dimensions. An object considered flat for purposes of one operation at the micron level may be unsuitably irregular for operations at the nanometer and picometer levels. In order to compensate for some irregularities that are inherent with many chucks and mirror assemblies, the annular ring can have a purposefully irregular shape that can compensate for irregularities in a chuck, for example. Shown in FIG. 5 is a series of side views of possible configurations 510, 520, 530, and 540 for use with a mirror assembly. As can be seen from the figure, rotating the ring will have a predictable effect on the chuck mounted to the ring. It is to be appreciated that the configurations shown are not necessarily to scale—they are for illustrative purposes only. Further, any number of irregular shapes of annular ring can be employed to accommodate an irregular chuck, and one of ordinary skill in the art will appreciate that the shapes shown in FIG. 5 are but a few possible examples.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Figure 6:
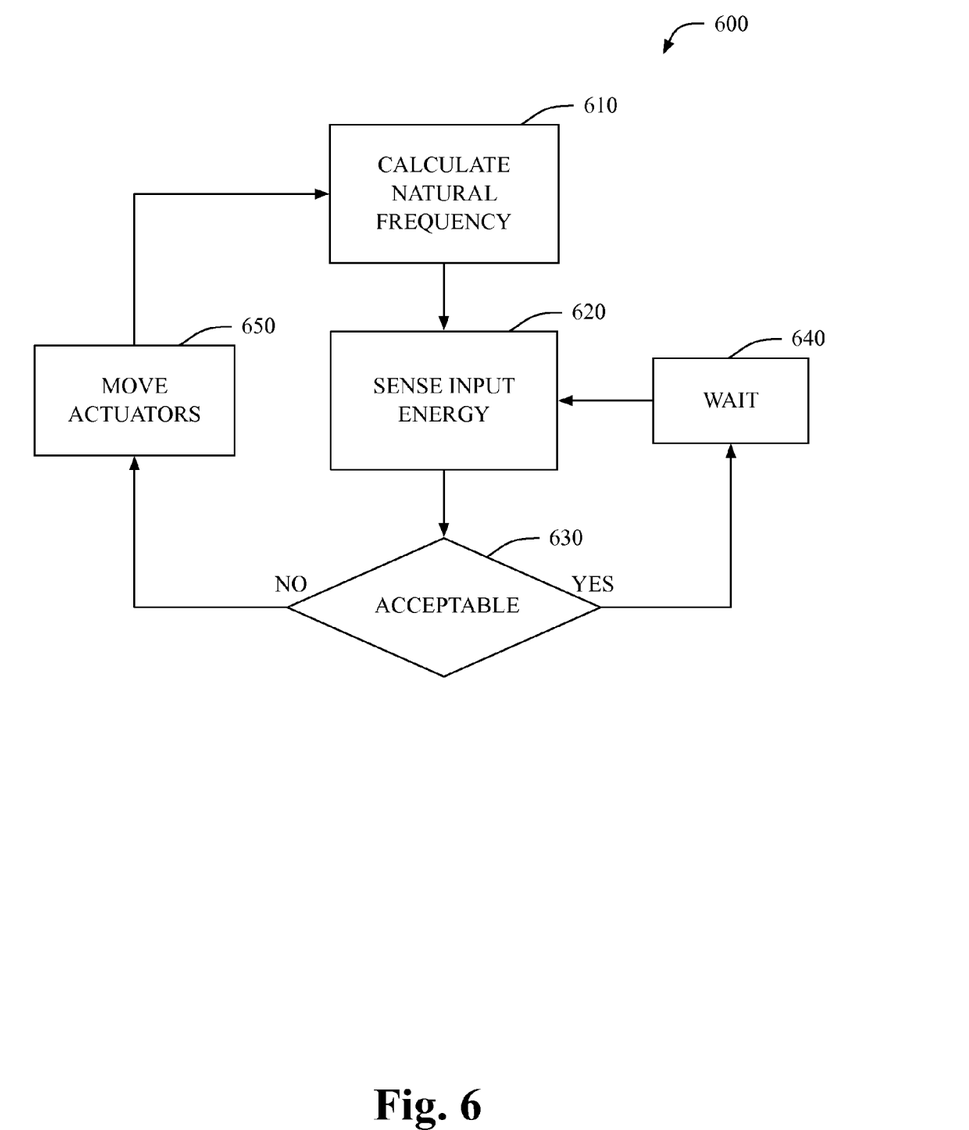
FIG. 6 is a flow chart diagram of a methodology that facilitates resonance avoidance.
Figure 7:
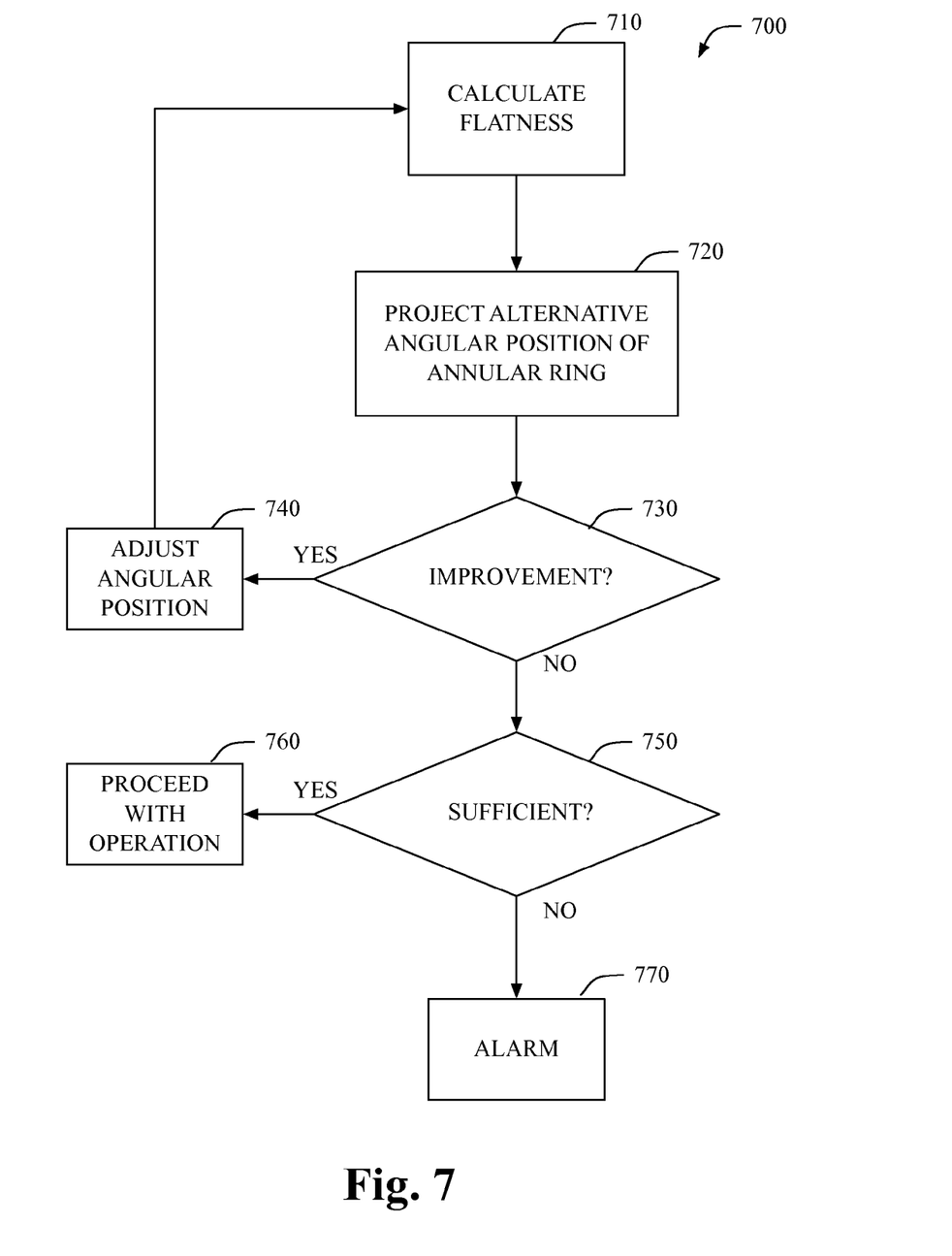
FIG. 7 is a flow chart diagram of a methodology that assists in projecting alternative configurations for a supporting structure and analyzing the sufficient of a configuration as compared to a tolerance.
Figure 8:
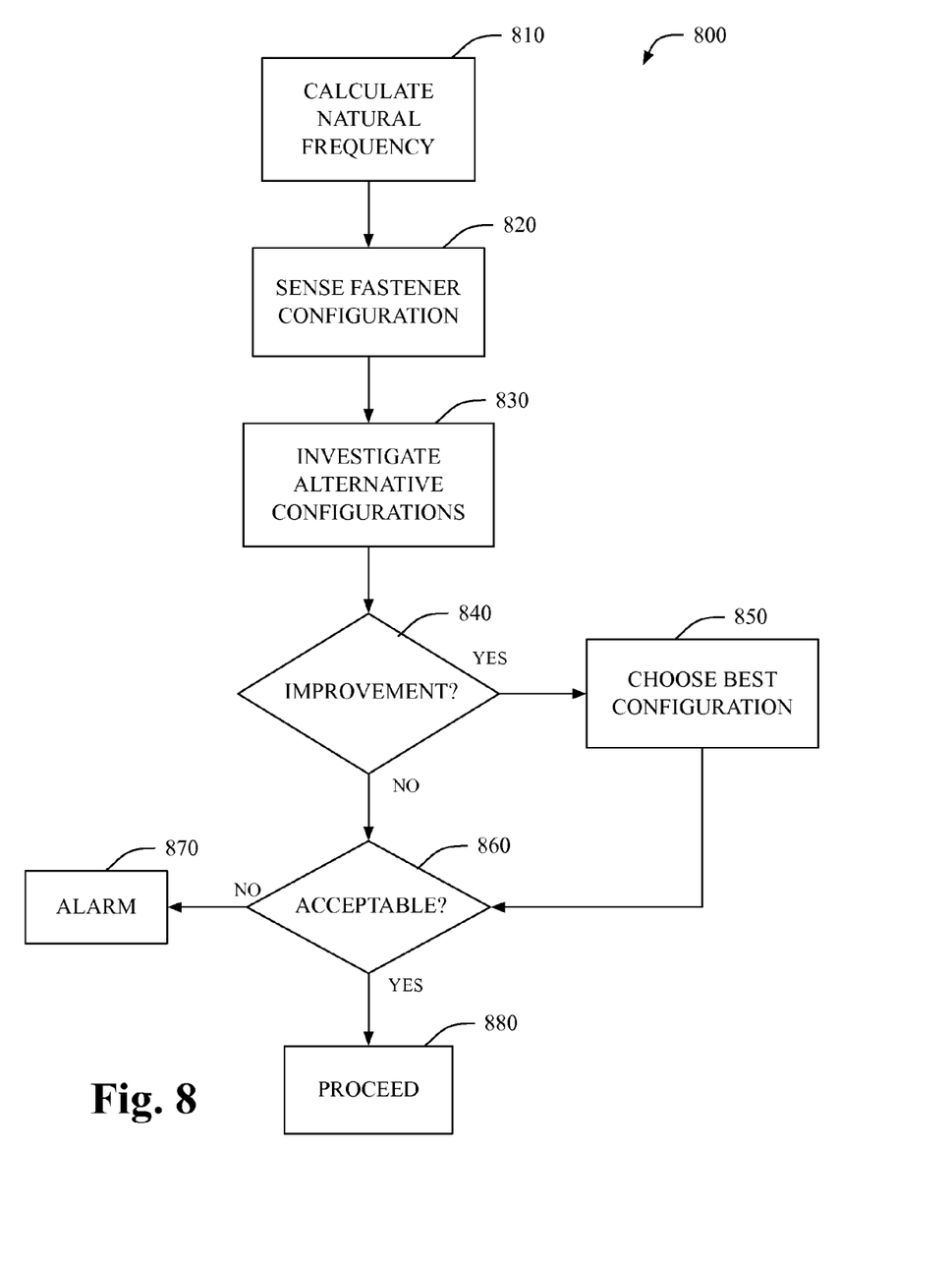
FIG. 8 is a flow chart diagram of a methodology for assessing boundary conditions such as fastener configurations as related to the natural frequency of a structure.

In view of the illustrative systems described supra, methodologies that can be implemented in accordance with the disclosed subject matter will be better appreciated with reference to the flow charts of FIGS. 6-8. While for purposes of simplicity of explanation, the methodology is shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodology described hereinafter.

FIG. 6 illustrates a methodology 600 that mitigates problems associated with resonant forces in a supporting structure. At reference numeral 610, the natural frequency of a structure can be calculated. Many existing techniques exist for calculating natural frequency, including simulative methods such as finite-element methods. The natural frequency need not be calculated to a high degree of accuracy, since input forces that approach, but do not reach the natural frequency can also cause damage to a structure. Therefore, to save computing time and for efficiency purposes, a less involved calculation is possible. In another aspect, if a highly accurate calculation is desired and possible, such can also be performed. At reference numeral 620, the input energy is sensed. The input can be from a variety of sources such as an actuator, a manufacturing operation, a laser sensor, or the like. Virtually any action taken on the structure can cause an input of energy and therefore can affect the structure. At reference numeral 630, the input forces are analyzed and compared to the natural frequency of the system.

As described previously, resonance can cause extremely high deflections and stress in a structure, and therefore should be avoided. The preferable method of avoiding resonance is by ensuring that the lowest natural frequency of the structure is as high as possible, and that input forces do not approach this level. Accordingly, if it is determined that the natural frequency will not be reached, at reference numeral 640 a predetermined amount of time can pass before another assessment is made. In an aspect, a single assessment can be sufficient and the methodology can stop at this point. If, however, the input forces do approach the natural frequency of the structure, at reference numeral 650 an adjustment can be made by moving one or more actuators. Altering the boundary conditions of certain components of the system can affect the natural frequency, but will likely have a limited range of motion, and the results of the motion may not be predictable, so once the motion has been performed the methodology can repeat. Given the likely limitations on the affect that moving a component of the structure can have on the natural frequency, and the limitations on the range of motion of the movable components, if it is determined that one of these limitations has been reached, an alarm can be sent and the operation can be halted if resonance is predicted to occur.

FIG. 7 is a depiction of a methodology 700 that provides a mirror assembly with a way to accommodate inherent irregularities in a supporting structure such as a chuck. At reference numeral 710, the flatness of the chuck is calculated. This can be performed by a system of lasers that are positioned above a chuck and mirror assembly, and the lasers, in conjunction with the mirror assembly, can be used to detect a vertical distance between various points of the mirror assembly and the sensors, which can then be used to calculate flatness. Such sensors can be extremely accurate, and can detect small variations in the chuck or the underlying system. If the mirror is judged to be flat to within a tolerance, the operation can proceed without further adjusting. However, if the object surface is not sufficiently flat, at reference numeral 720 alternative angular positions of an annular ring can be projected. As discussed above and shown in FIG. 5, the chuck can be supported at least in part by an annular ring which can be constructed of non uniform thickness such that rotation of the ring effectuates an altered surface condition. The ring can take a variety of shapes, and the shape of the ring used in a particular application can be known. In accordance with the shape of the ring, the flatness can be modified by adjusting the annular ring's angular position. In an aspect, the ring can also be moved transversely in addition to or in place of rotation.

Before moving the ring, however, the flatness of the chuck can be projected at least one alternative position of the ring, and at reference numeral 730, the flatness at the projected position is compared to the current flatness. If an improvement can be made at another position, at reference numeral 740 the annular ring is so moved. If no improvement can be had by moving the ring, at reference numeral 750, the flatness is compared to a tolerance level, and if the flatness is sufficient, at reference numeral 760 the operation can proceed. If the tolerance is exceeded, reference numeral 770 indicates that an alarm can be sent indicating the fact. The alarm can serve to temporarily or permanently stop an operation to prevent damage or defective workmanship caused by poor flatness qualities. In addition, a user or other oversight mechanism can be notified.

The above description refers to a characteristic, flatness, of a chuck. It is to be appreciated that the subject innovation is not necessarily limited to adjusting flatness. The annular ring can have different properties at different angular positions, and under differing circumstances some properties can be more advantageous than others. The methodology 700 described and depicted can be applied to such a case, as will be appreciated by one having skill in the art.

FIG. 8 depicts a methodology 800 that assists with minimizing resonant forces in a system by adjusting a fastener configuration to maximize the natural frequency of a supporting structure. At reference numeral 810, the natural frequency of a supporting structure is calculated. There are many ways of calculating or approximating the natural frequency of a structure, any of which can be employed. The natural frequency may be approximated at a relatively low level of accuracy since resonance forces can arise at input force levels that approach the natural frequency. It is good practice to avoid resonant frequencies by as wide a margin as possible.

The subject innovative methodology 700 is described with reference to a support for a mirror structure; however, it is to be appreciated that the methodology 700 can be applied to virtually any structure. At reference numeral 820, a fastener configuration is detected. Fasteners can be utilized to constrain motion in any number of manners, and each fastener configuration can have a differing effect upon the natural frequency of a system. In the case of a system that is over-constrained (hyperstatic), for example, the shape of the deflecting structure will be different than another fastener configuration. At different fastener configurations the natural frequency is affected, but each may provide an advantageous configuration depending on the needs of an application.

At reference numeral 830, alternative fastener configurations can be investigated through simulation, or other means of calculating or predicting the natural frequency of a system under a given configuration. At reference numeral 840, the alternative configurations can be compared to the existing configuration, and if an improvement is found, at reference numeral 850 the best of a plurality of configurations is chosen. If no improvement is found, or after the best alternative is found, at reference numeral 860, the characteristics of the structure is assessed to determine whether the structure falls within acceptable limits. If not, an alarm can be created and sent to a user or appropriate oversight mechanism which may halt an operation to avoid damaging components of the system. If the tolerance limits are not exceeded, at reference numeral 880, the operation can proceed. Throughout this methodology, if an alternative is found that is projected to provide more advantageous results than a current configuration, the cost of achieving that alternative can be weighed against the gains. In an aspect, the projected configuration must be more than trivially better than a current configuration to ensure that moving components is worth the cost in time and energy.

The methods and systems of the subject innovation can be employed in association with many forms of control systems. In order to provide context for the various applications in which the aspects of the innovation may be carried out, an exemplary control system is now illustrated and described with respect to FIGS. 9 and 10. However, it will be appreciated that the various aspects of the innovation may be employed in association with controllers and control systems other than those illustrated and described herein. A distributed industrial control system 910 suitable for use with the subject innovation provides a first and second rack 912A and 912B for holding a number of functional modules 914 electrically interconnected by backplanes 916A and 916B running along the rear of the racks 912A and 912B respectively. Each module 914 may be individually removed from the rack 912A or 912B thereby disconnecting it from its respective backplane 916 for repair or replacement and to allow custom configuration of the distributed system 910.

Figure 9:
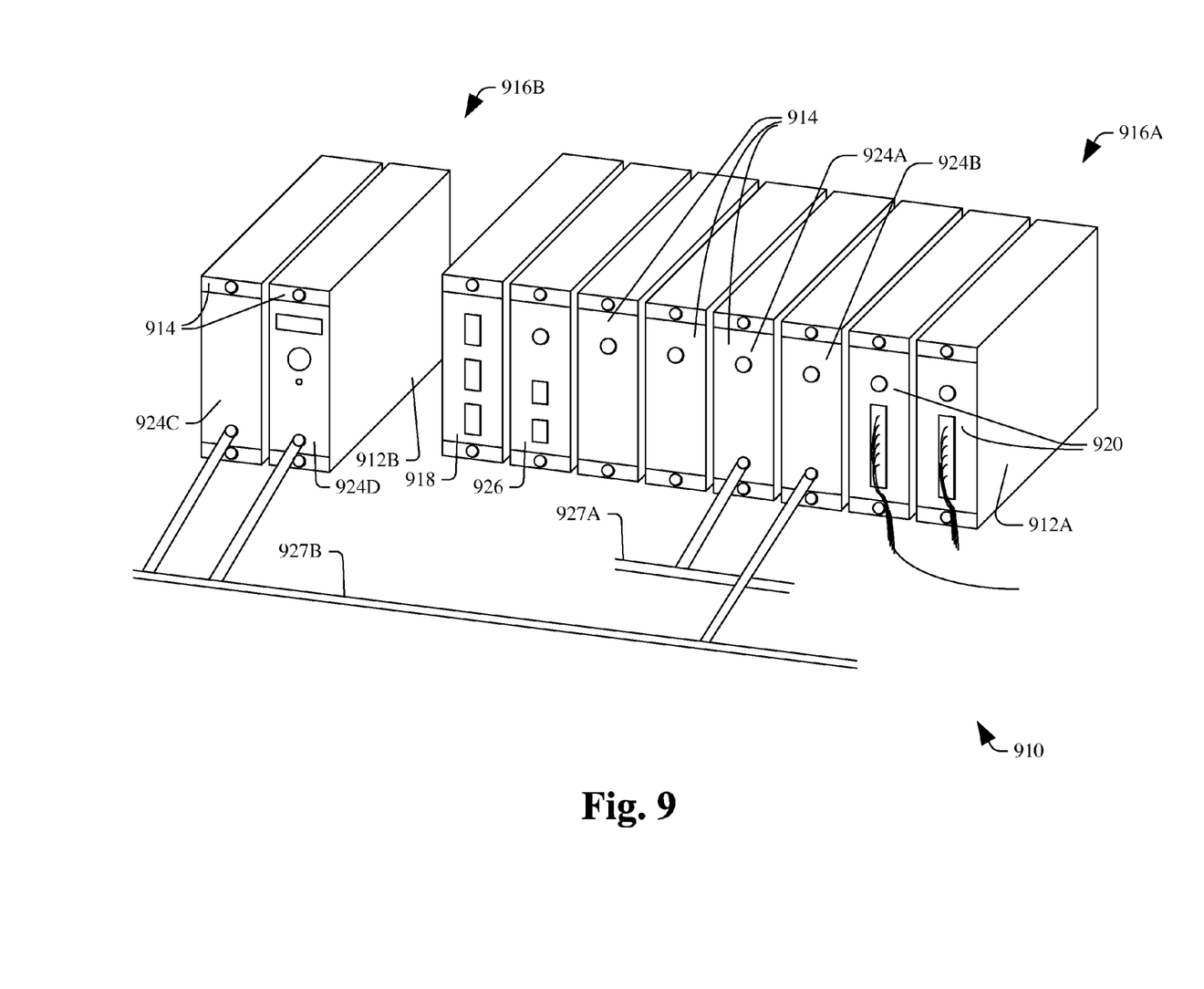
FIG. 9 illustrates an exemplary environment where various aspects of the subject innovation can be implemented.

The modules 914 within the rack 912A may include, for example, a power supply module 918, a processor module 926, two communication modules 924A and 924B and two I/O modules 920. A power supply module 918 receives an external source of power (not shown) and provides regulated voltages to the other modules 914 by means of conductors on the backplane 916A. The I/O modules 920 provide an interface between inputs from, and outputs to external equipment (not shown) via cabling 922 attached to the I/O modules 920 at terminals on their front panels. The I/O modules 920 convert input signals on the cables 922 into digital words for transmission on the backplane 916A. The I/O modules 920 also convert other digital words from the backplane 916A to the necessary signal levels for control of equipment.

The communication modules 924A and 924B provide a similar interface between the backplane 916A and one of two external high speed communication networks 927A and 927B. The high speed communication networks 927A and 927B may connect with other modules 914 or with remote racks of I/O modules 920, controller configuration tools or systems, or the like. In the example illustrated in FIG. 9, the high speed communication network 927A connects with backplane 916A via the communication module 924A, whereas the high speed communication network 927B connects the communication module 924B with communication modules 924C and 924D in rack 912B. The processor module 926 processes information provided by the communication modules 924A and 924B and the I/O modules 920 according to a stored control program or routine, and provides output information to the communication module 924 and the I/O modules 920 in response to that stored program and received input messages.

Figure 10:
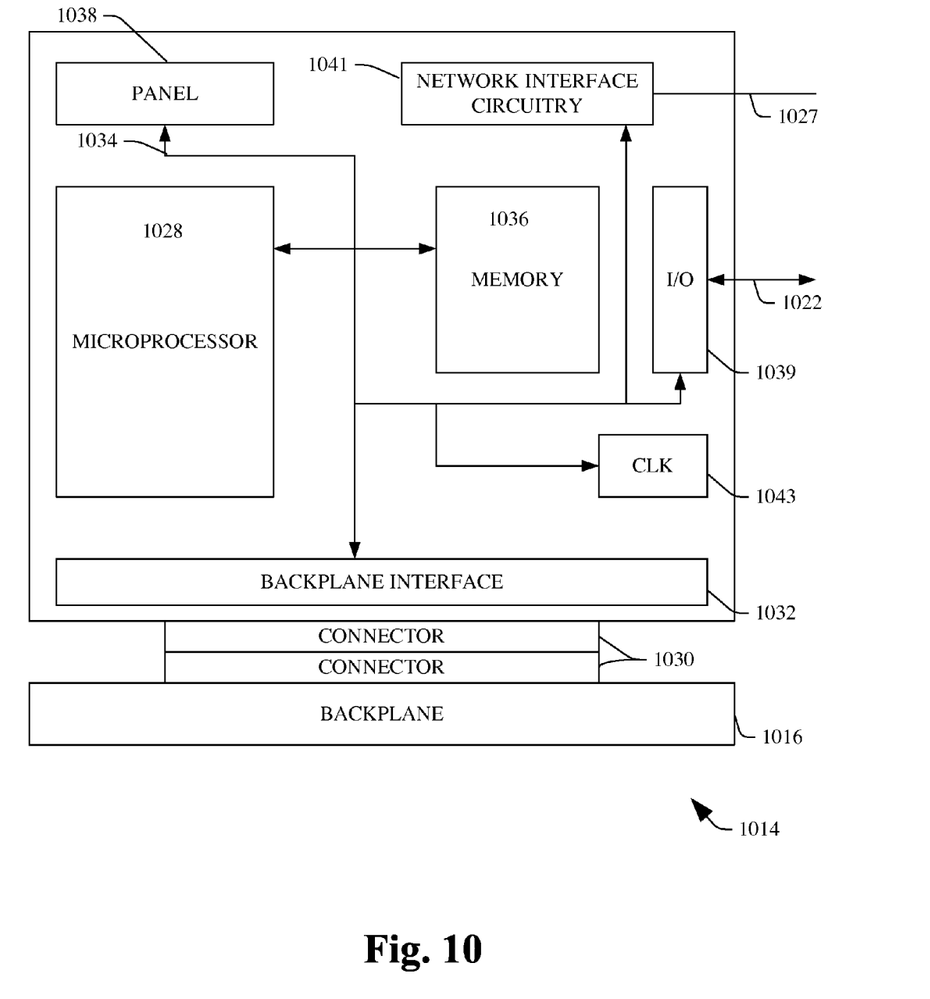
FIG. 10 illustrates a further exemplary environment wherein aspects of the innovation can be implemented.

Referring also to FIG. 10, each functional module 1014, is attached to the backplane 1016 by means of a separable electrical connector 1030 that permits the removal of the module 1014 from the backplane 1016 so that it may be replaced or repaired without disturbing the other modules 1014. The backplane 1016 provides the module 1014 with both power and a communication channel to the other modules 1014. Local communication with the other modules 1014 through the backplane 1016 is accomplished by means of a backplane interface 1032 which electrically connects the backplane 1016 through connector 1030. The backplane interface 1032 monitors messages on the backplane 1016 to identify those messages intended for the particular module 1014, based on a message address being part of the message and indicating the message destination. Messages received by the backplane interface 1032 are conveyed to an internal bus 1034 in the module 1014.

The internal bus 1034 joins the backplane interface 1032 with a memory 1036, a microprocessor 1028, front panel circuitry 1038, I/O interface circuitry 1039 (if the module is an I/O module 920) and communication network interface circuitry 1041 (if the module is a communication module 924). The microprocessor 1028 may be a general purpose microprocessor providing for the sequential execution of instructions included within the memory 1036 and the reading and writing of data to and from the memory 1036 and the other devices associated with the internal bus 1034. The microprocessor 1028 includes an internal clock circuit (not shown) providing the timing of the microprocessor 1028 but may also communicate with an external clock 1043 of improved precision. This clock 1043 may be a crystal controlled oscillator or other time standard including a radio link to an external time standard. The precision of the clock 1043 may be recorded in the memory 1036 as a quality factor. The panel circuitry 1038 includes status indication lights such as are well known in the art and manually operable switches such as for locking the module 1014 in the off state.

The memory 1036 may comprise control programs or routines executed by the microprocessor 1028 to provide control functions, as well as variables and data necessary for the execution of those programs or routines. For I/O modules 920, the memory 1036 may also include an I/O table holding the current state of inputs and outputs received from and transmitted to the industrial controller 910 via the I/O modules 920. The module 1014 may be adapted to perform the various methodologies of the innovation, via hardware configuration techniques and/or by software programming techniques.

Although the innovation has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. In this regard, it will also be recognized that the innovation includes a system as well as a computer-readable medium having computer-executable instructions for performing the acts and/or events of the various methods of the innovation.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A support system for a mirror assembly, comprising:
   a first arm and a second arm arranged to form an L-shaped support;
   a shelf member located in a corner of the L-shaped support and supported by the L-shaped support;
   a first finger attached to the first arm and a second finger attached to the second arm, the first and second fingers and the shelf member support a chuck;
   an annulus attached to the chuck to provide support to the chuck;
   a vibration detection component that detects energy input to the system that causes vibration in the system; and
   an alarm component that provides an alarm if the energy input approaches a natural frequency of the system.

2. The support system of claim 1, at least one of the first and second fingers is constructed of an alloy comprising aluminum and beryllium that provides high stiffness at a low mass, the at least one of the first and second fingers has dimensions selected to increase a lowest natural frequency of the support system.

3. The support system of claim 1, the annulus is constructed of an alloy comprising iron, nickel, carbon, and chromium that is highly heat resistant and having a controlled coefficient of thermal expansion, the annulus has dimensions selected to increase a lowest natural frequency of the support system.

4. The support system of claim 1, the annulus connects to an actuator to move the annulus and the chuck.

5. The support system of claim 1, wherein the alarm component provides an alarm if vibration exceeds safe levels.

6. The support system of claim 1, further comprising:
   a plurality of sensors that detect at least one of energy input or natural frequency characteristics of the system;
   a natural frequency component that calculates the natural frequency of the system; and a control component that receives information regarding energy input and natural frequency and directs at least one actuator to move at least one of the first or second fingers, or the annulus to adjust the natural frequency.

7. The support system of claim 6, the control component directs the at least one actuator to move at least one of the first or second fingers or the annulus if the energy input approaches the natural frequency such that resonance is likely.

8. The support system of claim 6, further comprising one or more fasteners employed to restrict motion of the at least one of the first or second fingers or the annulus, wherein the fasteners are configured based upon one or more simulations to increase a lowest natural frequency of the support system.

9. The support system of claim 6, the annulus has an irregular shape such that rotating the annulus causes tilting of the chuck.

10. The support system of claim 1, wherein the dimensions of at least one of the first arm, the second arm, the shelf member, the first finger, the second finger, the chuck, and the annulus are selected to increase the lowest natural frequency of the support system.

11. A support system for a mirror assembly, comprising:
a first arm and a second arm arranged to form an L-shaped support;
a shelf member located in a corner of the L-shaped support and supported by the L-shaped support;
a first finger attached to the first arm and a second finger attached to the second arm, the first and second fingers and the shelf member support a chuck;
an annulus attached to the chuck to provide support to the chuck, and
a plurality of sensors that detect at least one of energy input or natural frequency characteristics of the system;
a natural frequency component that calculates the natural frequency of the system; and
a control component that receives information regarding energy input and natural frequency and directs at least one actuator to move at least one of the first or second fingers, or the annulus to adjust the natural frequency.

12. The support system of claim 11, the control component directs the at least one actuator to move at least one of the first or second fingers or the annulus if the energy input approaches the natural frequency such that resonance is likely.

13. The support system of claim 11, further comprising one or more fasteners employed to restrict motion of the at least one of the first or second fingers or the annulus, wherein the fasteners are configured based upon one or more simulations to increase a lowest natural frequency of the support system.

14. The support system of claim 11, the annulus has an irregular shape such that rotating the annulus causes tilting of the chuck.

* * * * *